(12) United States Patent
Novak et al.

(10) Patent No.: US 7,206,500 B1
(45) Date of Patent: *Apr. 17, 2007

(54) SYSTEM AND METHODS FOR RECORDING BROADCAST PROGRAMS, CONVERTING THE PROGRAMS AND MANAGING THE STORAGE IN A DIGITAL MEDIA PLAYBACK DEVICE

(75) Inventors: Robert E. Novak, Santa Clara, CA (US); Michael E. Sears, Los Altos, CA (US)

(73) Assignee: Melodeo, Inc., Seattle, WA (US)

( * ) Notice: Subject to any disclaimer, the term of this patent is extended or adjusted under 35 U.S.C. 154(b) by 1024 days.

This patent is subject to a terminal disclaimer.

(21) Appl. No.: 10/350,159

(22) Filed: Jan. 23, 2003

Related U.S. Application Data (60) Provisional application No. 60/369,541, filed on Apr. 2, 2002, provisional application No. 60/355,780, filed on Feb. 9, 2002, provisional application No. 60/355,094, filed on Feb. 8, 2002, provisional application No. 60/355,167, filed on Feb. 7, 2002, provisional application No. 60/350,905, filed on Jan. 23, 2002.

(51) Int. Cl.
*H04M 11/00* (2006.01)

(52) U.S. Cl. .................. 386/104; 386/83; 379/102.03

(58) Field of Classification Search .................. 386/46, 386/83, 104–106, 112; 360/7, 8, 15, 60; 369/47.28, 47.29, 47.3, 84–85; 375/240.24; 348/712–719, 231.1, 234; 704/200.1, 500–504; 379/102.03
See application file for complete search history.

(56) References Cited

U.S. PATENT DOCUMENTS

| 7,016,418 | B2* | 3/2006 | Wang et al. | 375/240.24 |
| 7,120,734 | B2* | 10/2006 | Ogino | 711/111 |
| 7,126,770 | B1* | 10/2006 | Arai et al. | 360/8 |

* cited by examiner

*Primary Examiner*—Thai Q. Tran
*Assistant Examiner*—Mishawn Dunn
(74) *Attorney, Agent, or Firm*—Black Lowe & Graham PLLC (57) ABSTRACT

This disclosure deals with the management of recording programs from Radio Frequency transmissions converting such transmissions into alternative formats and managing the 'freshness' of content which is placed in the memory of a portable digital media playback device. Specifically this disclosure deals with the mechanisms to automate the memory management functions in a variety of ways that allow for two-way communication about content usage in the portable device.

2 Claims, 10 Drawing Sheets

| Group | Type | Location | Installation | Persistence | Class |
|---|---|---|---|---|---|
| 1 | R/W | Local | WIRED | Ephemeral | RAM |
| 2 | R/O | Local | WIRED | Permanent | ROM |
| 3 | R/W | Local | WIRED | Semi | FLASH |
| 4 | R/W | Local | Slot | Semi | FLASH |
| 5 | R/O | Local | Disc | Semi | CD-ROM |
| 6 | R/W | Local | Disc | Volatile | Magnetic Disk |
| 7 | R/W | Network | Network | Volatile | Magnetic Disk |
| 8 | R/O | Network | Network | Semi | Web Server |

| Group to Category | News | Entertainment | Weather | Traffic | Sports | $ - Financial |
|---|---|---|---|---|---|---|
| 1 | 60% | 0% | 5% | 10% | 10% | 15% |
| 2 | 40% | 0% | 20% | 5% | 5% | 30% |
| 3 | 70% | 0% | 0% | 0% | 0% | 30% |
| 4 | 0% | 50% | 10% | 10% | 10% | 20% |
| 5 | 60% | 30% | 0% | 0% | 5% | 5% |
| 6 | 0% | 40% | 0% | 0% | 0% | 60% |
| 7 | 18% | 18% | 9% | 9% | 18% | 18% |
| 8 | 25% | 25% | 0% | 0% | 25% | 25% |

Figure 7

| Number | Program Type | Interrupt types | Maximum Duration | Minimum Duration (uninterrupted) | Total Time |
|---|---|---|---|---|---|
| 1 | ID Ad | 0 | 0:15 | 0:15 | 0:15 |
| 2 | Music (Pop) | 0 | 5:00 | 5:00 | 5:15 |
| 3 | SP1 AD | 0 | 1:00 | 1:00 | 6:15 |
| 4 | News | 5,6,7 | 15:00 | 3:00 | 21:15 |
| 5 | SP2 AD | 0 | 1:00 | 1:00 | 22:15 |
| 6 | SP3 AD | 0 | 0:30 | 0:30 | 22:45 |
| 7 | ID AD | 0 | 0:15 | 0:15 | 23:00 |
| 8 | Weather | 0 | 1:00 | 1:00 | 24:00 |
| 9 | SP3 AD | 0 | 0:30 | 0:30 | 24:30 |
| 10 | Traffic | 0 | 1:00 | 1:00 | 25:30 |
| 11 | ID AD | 0 | 0:15 | 0:15 | 25:45 |
| 11 | SP3 AD | 0 | 0:30 | 0:30 | 26:15 |
| 12 | Sports | 13,14 | 2:00 | 1:00 | 28:15 |
| 13 | SP3 AD | 0 | 0:30 | 0:30 | 28:45 |
| 14 | ID AD | 0 | 0:15 | 0:15 | 29:00 |
| 15 | SP4 AD | 0 | 1:00 | 1:00 | 30:00 |

30 minute Schedule

SYSTEM AND METHODS FOR RECORDING BROADCAST PROGRAMS, CONVERTING THE PROGRAMS AND MANAGING THE STORAGE IN A DIGITAL MEDIA PLAYBACK DEVICE

RELATED APPLICATIONS

The present invention claims the benefit of U.S. Provisional Application No. 60/355,780, entitled "System and Methods for Recording Broadcast Programs, Converting the Programs and Managing the Storage in a Digital Media Playback Device," filed Feb. 9, 2002, with inventors Robert E. Novak and Michael E. Sears, which is hereby incorporated by reference in its entirety for all purposes. The present invention also claims the benefit of U.S. Provisional Application No. 60/369,541, entitled "System and Methods for Fresh Content Heuristics in a Digital Media Player," filed Apr. 2, 2002, with inventors Robert E. Novak and Michael E. Sears, which is hereby incorporated by reference in its entirety for all purposes. The present invention also claims the benefit of U.S. Provisional Application No. 60/355,094, entitled "System and Methods for Logical Retrieval Sections in a Digital Media Player," filed Feb. 8, 2002, with inventors Robert E. Novak and Michael E. Sears, which is hereby incorporated by reference in its entirety for all purposes. The present invention also claims the benefit of U.S. Provisional Application No. 60/355,167, entitled "System and Methods for Logical Memory Devices in a Digital Media Player," filed Feb. 7, 2002, with inventors Robert E. Novak and Michael E. Sears, which is hereby incorporated by reference in its entirety for all purposes. The present application also claims the benefit of U.S. Provisional Application No. 60/350,905, entitled "Uniform Memory Management for Personal Devices with non-Uniform Memory Systems," filed Jan. 23, 2002, with inventors Robert E. Novak and Michael E. Sears, which is hereby incorporated by reference in its entirety for all purposes.

TECHNICAL FIELD

This disclosure relates generally to electronics and communications, and more particularly to interactive radio and digital media playback systems.

BACKGROUND

A digital media playback device typically includes a handheld device such as an MP3 player. Some MP3 players are implemented as software programs on Personal Computers. Handheld MP3 players have limited memory sizes that can consist of Flash Memory, dynamic RAM memory and rotating CD-ROM memory. However, these types of MP3 players have required that the user/consumer must manage the memory content (also known as playlists) on the MP3 Player.

This manual management of the memory content has restricted the use of these devices only to users/consumers that are computer literate and are able to manage the storage on the various types of memory in the MP3 device. For example in typical MP3 player there may be 'internal memory' that is built-in to the device when it is manufactured and Flash Memory (sometimes in the form of Smart Media cards or CompactFlash cards) which is inserted into the device by the user/consumer after a separate purchase. The user/consumer must be cognizant of the various types of memory in the device and the limitations of the capacity of the devices. In addition, the digital media players were envisioned to only handle the playback of music files. However, there are many more types of digital media than music. For example, there is spoken audio that falls in the categories of News, Weather, Sports, Traffic and Entertainment. Thus, it would be desirable to automatically manage all of the memory space for the electronic media files for the consumer/user.

In addition, although there are radios that can connect to computers and that allow for the recording of programs, they require that the consumer/user know the exact time and frequency of the program to record. In addition, these programs require that the consumer/user must manually intervene when the recording is complete to save the recording in a manually specified file name. In order to utilize these recording programs, the consumer/user must gather and manually collect the information about the program schedule, availability and the suitability of a broadcaster in their geographic location.

It is currently possible for a consumer to manually convert recorded sound files (e.g., WAV files that are simple analog to digital encoding of the analog sound signal) into MP3 files (MPEG Level 3—an industry standard compression format). However, it is a difficult and cumbersome manual process to track the newly recorded files and convert them.

It is currently possible to download the MP3 files into a digital media player (software player or hardware player) and play the converted files on the digital media player. However, it is a cumbersome, difficult and manual process to perform all of these steps for a consumer. Hence it would be an advancement of the state of the art if there is a system and method for automatically managing the selection of programs, recording of programs, conversion of programs, downloading of programs to a digital media player and automating the process of keeping the content on the digital media player fresh for the consumer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE BACKGROUND ART

Generally in a system that supports the recording, conversion and downloading of audio information from the radio, the radio content is produced in a studio. The studio sends the audio tape of the broadcast information to a post production house where commercials are inserted and the audio tape is edited for timing to fit within production time slots. Certain commercial time slots are filled with generic or filler commercials, but are specially tagged by audio tones so that a local radio station can insert their local commercials in place of these generic commercials. The final production content is often distributed by a variety of mechanisms. For older stations, the content is sent to them on audio tape for playback. For newer stations, the content is transmitted over special leased lines or satellite links to the receiving radio station, which will either record the content from the incoming signal for delayed playback, or play the content synchronously with the transmission.

The local station can provide editing in house to insert its own local commercials in place of the specially marked generic commercials. The local station may have its own local studio for production of programs, some of which may be transmitted live as the programs are being made. This is typical of News programs and 'live' disk jockey (DJ) shows that are often transmitted during viewer/listener commuting times.

In a system for recording radio programs and storing them in an MP3 player, the following steps occur. The consumer/user may select programs that they desire to hear from a program guide that is provided to the consumer in a variety of methods.

The guide data can be presented to the consumer/user in a variety of ways. It can be presented by a web based HTML/XML application that uses a browser to display the guide data. The data can also be presented by an application running on the consumer/user computer.

The data can be transmitted to the consumer/user computer by a variety of methods. It can be sent over a network (such as the Internet) or it can be distributed to the consumer via some form of magnetic or optical storage (magnetic disk, e.g., floppy disk or optical disk, e.g. CD-ROM) device. Other methods of data transfer are possible.

The consumer/user then makes choices about which programs they want to hear. The listing of programs can contain data which includes (but is not limited to):

1. Program Information
  Name of Recording (e.g., Morning Edition)
  Recording Genre
  Band Selection for Recording (AM, FM, TV)
  Side Band (Upper, Lower)<-advanced feature not available in all radios
  Frequency in Hertz
2. Schedule of program
  Start Date
  End Date
  Days of week (S, M, T, W, T, F, S)
  Time of Day (24 hr format)
  Duration of the program (in minutes and seconds)
  Repeat (daily—no days selected, weekly—repeat every week on selected days, biweekly, monthly, bimonthly, annually).

An application on the consumer/user computer then can use task-scheduling software in the operating system or use its own task scheduling daemon process to start a recording task just prior to the time of the broadcast. The recording application will then use a unique algorithm to insure that the recording of the broadcast can be associated with the program database. This can be done in several ways.

The filename of the recording can be encoded to contain the information about the recorded program. Alternative implementations are possible. In one embodiment a data structure is added into the recording file that has a header block (written before the recording data) that contains all of the information about the recorded program. In another embodiment a file with an identical name to the recorded data file, but a different file type can be paired with the recording file to hold the information about the recording. Other techniques are possible.

The recording application can usually store the data in one of two formats (additional formats are possible). The first format is WAV format. A WAV format is a digitized analog format. The second format is called MP3 (MPEG Layer 3) which is a digital format that includes (inaudible) compression with loss of signal data.

In one embodiment, once the recording has been completed then a task to transform the WAV style file into a compressed digital format such as MP3 is begun. Other embodiments may include direct recording into MP3 format with only a slight buffering delay to accumulate enough audio to perform compression.

After the file has been converted into a compressed digital format suitable for playback in a digital media player device (e.g., MP3 Player), then the sound file along with track title information is transferred to the MP3 player.

Figure 1:
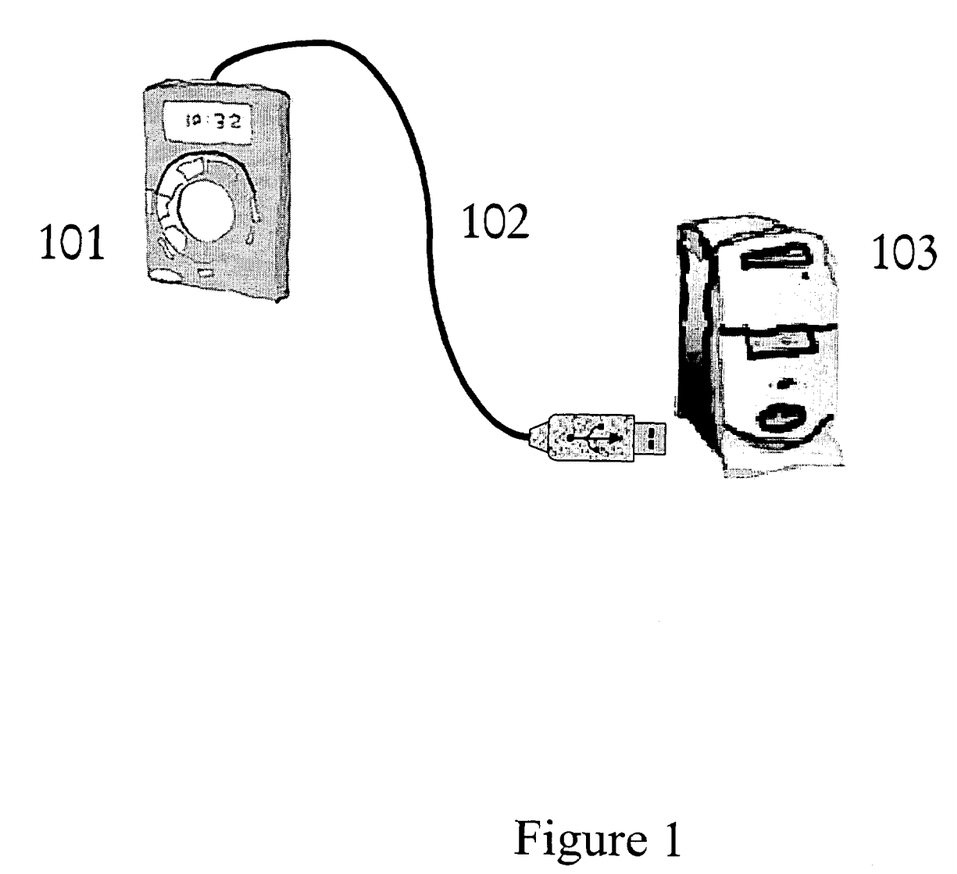
FIG. 1 is a diagram of an MP3 device connected to a personal computer according to one embodiment of the invention.

Referring now to FIG. 1 there is shown an embodiment of the invention with a digital media playback device 101, illustrated here as an MP3 Player although other digital media playback devices such as DVD players are possible. The device 101 is connected to a computer 103, representative of any computing device with a processor and storage and possibly a network connection. The connection between the device 101 and the computer 103 is made with a communicative coupling 102. The communicative coupling 102 is shown as a USB Connection Cable but other couplings are possible, such as 1394—aka Firewire, Parallel Port, Serial Port, IRdA or RF communications. Through this coupling two-way communications take place between the computer 103 and the digital media playback device 101.

In North America, the Amplitude Modulation (AM) band is 535 kilohertz to 1.7 megahertz in the Radio Frequency (RF) spectrum. The Frequency Modulation (FM) band for North America spans 88 megahertz to 108 megahertz in the RF spectrum. Although this description is specifically about the production, broadcast and recording of radio signals in the broadcast frequencies, there is no reason to limit this description to these segments of the RF spectrum. All of the above descriptions apply to any set of frequencies where signals have been encoded in a variety of audio, video, teletext, telefax and/or Morse code or other encoding. This includes spread spectrum and frequency agile encoding.

Figure 2:
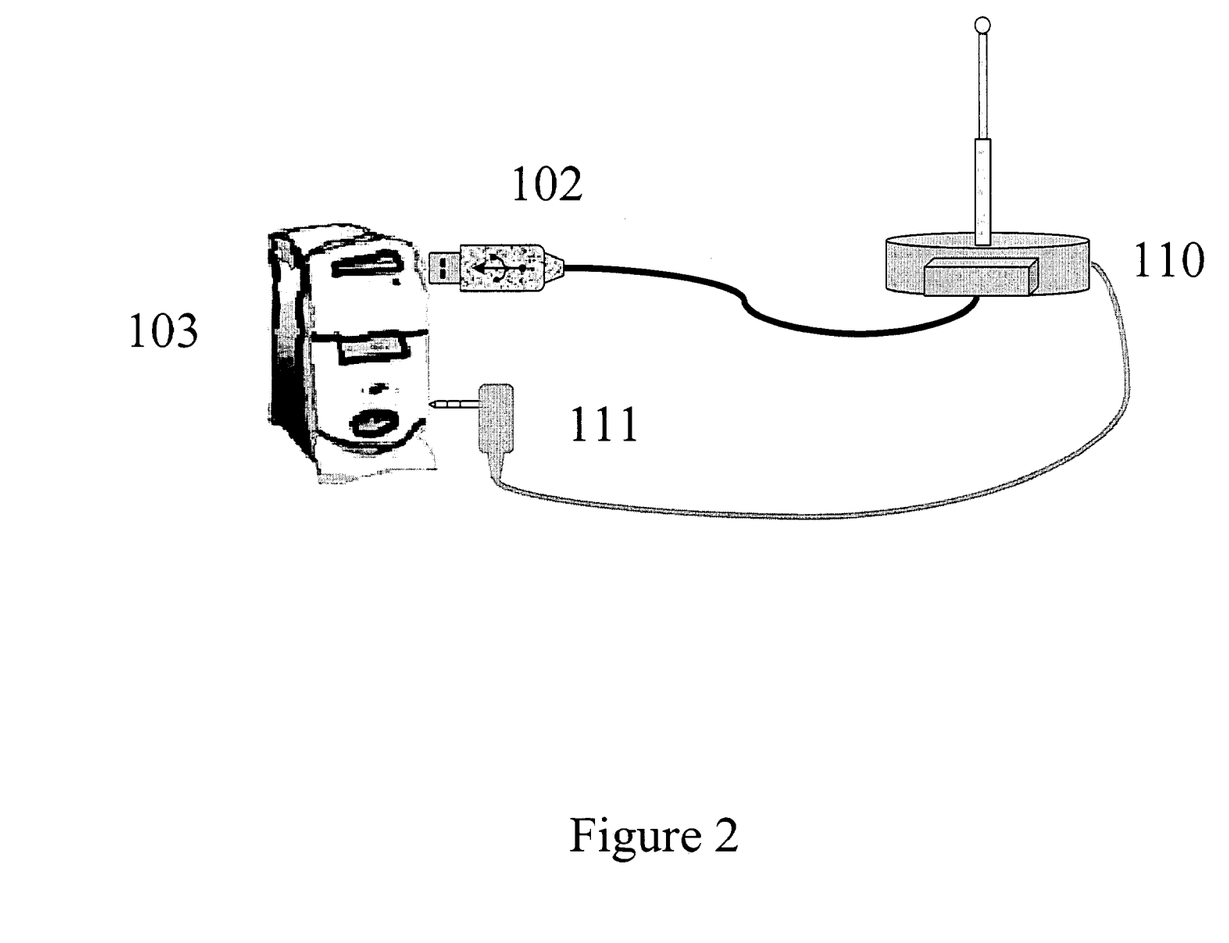
FIG. 2 is a diagram that illustrates a computer controlling the tuning and recording of a radio by a computer.

Referring now to FIG. 2 there is shown an embodiment of the invention with a radio receiver 110. In this illustration the radio receiver 110 is communicatively coupled to a computer 103 with two different communication paths. The first communicative coupling 102 is shown as a USB Connection Cable, but other couplings are possible. The second coupling 111 carries analog audio data and is coupled to the computer 103 with a 2.5 mm stereo plug that connects to either a microphone or a line-in port on the computer 103. When the computer receives the analog signal it converts the signal to a digital format known as WAV by sampling the amplitude of the analog signal many times each second.

SUMMARY OF THE INVENTION

This invention deals with managing a schedule of programs of interest, automatically recording the programs, converting the recordings to a format suitable for a digital media player, automatically downloading the recordings to the digital media player and keeping the content on the digital media player fresh. This will facilitate not only the process of pushing content into the device in a managed way, but also managing the playback of the content in a way that keeps the playback process fresh for the consumer.

DETAILED DESCRIPTION OF THE PREFERRED EMBODIMENTS

In an embodiment of the invention, a consumer can peruse a listing of programs that are broadcast. The process of browsing the programs can be performed by viewing program information that is listed on an Internet website. Other implementations would download the program information to the consumer's computing device and then display the broadcast listings on any convenient display device. Possible display devices that could be communicatively coupled to the computer include computer video displays, flat panel displays, televisions, Personal Digital Assistants, remote controls and telephones with display panels. For some of these implementations the customer premise computing device may transfer the information about the broadcast listings to other customer premise equipment such as a Set Top Box, PDA or telephone. This other device may then control the browsing and selection of programs and through a communicative coupling transfer the information about the consumer's choices back to the customer premise computing equipment. Other implementations along this line are possible.

In another embodiment, the digital media player is a software program that runs on a personal computer. Windows Media Player™, Real Media Player™ and WinAMP™ are three examples of such software programs that will play back audio files encoded in MP3 format for listening.

In another embodiment, the digital media player is an external device which is connected to the personal computer with a USB, 1394, or other communicative coupling which allows the personal computer to send digital media files to the digital media player.

In another embodiment, the recording software requires manual management of the recorded content in the data storage (e.g., disk drives) of the computer.

In another embodiment, the recording software automatically manages the recorded content to keep the content within a fixed size allocation of space, based on a First In, First Out (FIFO) algorithm or a Least Recently Used algorithm. To implement the Least Recently Used Algorithm, the MP3 player must 'tag' the media file to mark which files have been accessed by the consumer user. The files with the 'oldest' tag are the first ones removed from the memory.

In another embodiment, the recording software automatically manages the recorded content to keep the content within a fixed size allocation of space, based on a Freshness Aging Algorithm provided by an external database that assigns freshness aging values to content by the genre of the content. The Freshness Aging Algorithm is described elsewhere in this document.

In another embodiment, the recording software automatically manages the recorded content to keep the content within a fixed size allocation of space, based on a combination of the Freshness Aging Algorithm and modifications to the freshness aging values provided by a consumer/user.

In another embodiment, the ephemeral storage manager that manages the content placed into a portable media player requires manual management of the content in the digital media player by the end user. In another embodiment, the ephemeral storage manager that manages the content placed into a portable media player manages the content on an automatic First In, First Out (FIFO) algorithm.

In another embodiment where the digital media player can provide feedback on the actual digital media segments that are played, then the ephemeral storage manager that manages the content can use a Least Recently Used algorithm to manage the content automatically.

In another embodiment where the ephemeral storage manager that manages the content placed on the digital media player can manage the content based on a Freshness Aging Algorithm provided by an external database that assigns freshness aging values to content by the genre of the content.

In another embodiment where the ephemeral storage manager that manages the content placed on the digital media player can manage the content based on a combination of the Freshness Aging Algorithm and modifications to the freshness aging values provided by a consumer/user.

In another embodiment where the digital media player can provide feedback on the actual digital media segments that are played, the ephemeral storage manager that manages the content placed on the digital media player, can manage the content based on a combination of the Freshness Aging Algorithm and modifications to the freshness aging values provided by a consumer/user and feedback from the digital media player.

The Freshness Aging Algorithm assigns a 'half-life' value to each of the media pieces that are stored in memory. For a media piece that is an audio/video of a traffic report, the half-life of the piece can be as short as 10 minutes. For a media piece that is a recording of Sir George Solti and the Chicago Symphony Orchestra playing Beethoven's Ninth Symphony, the 'half-life' of the piece can be as long as 40 years.

Figure 3:
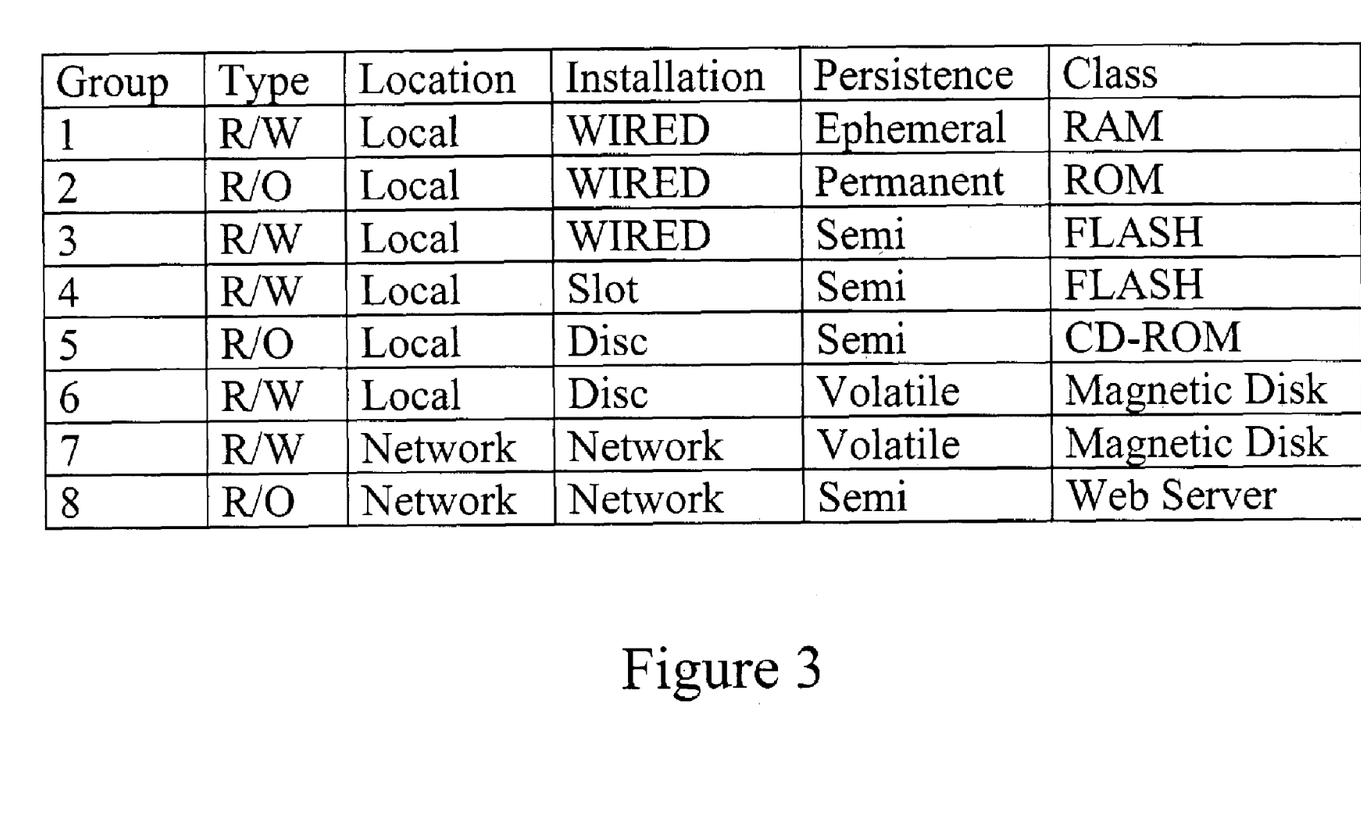
FIG. 3 is a table that describes the types of memory typically communicatively coupled with digital media playback devices according to an embodiment of the invention.
Figure 4:
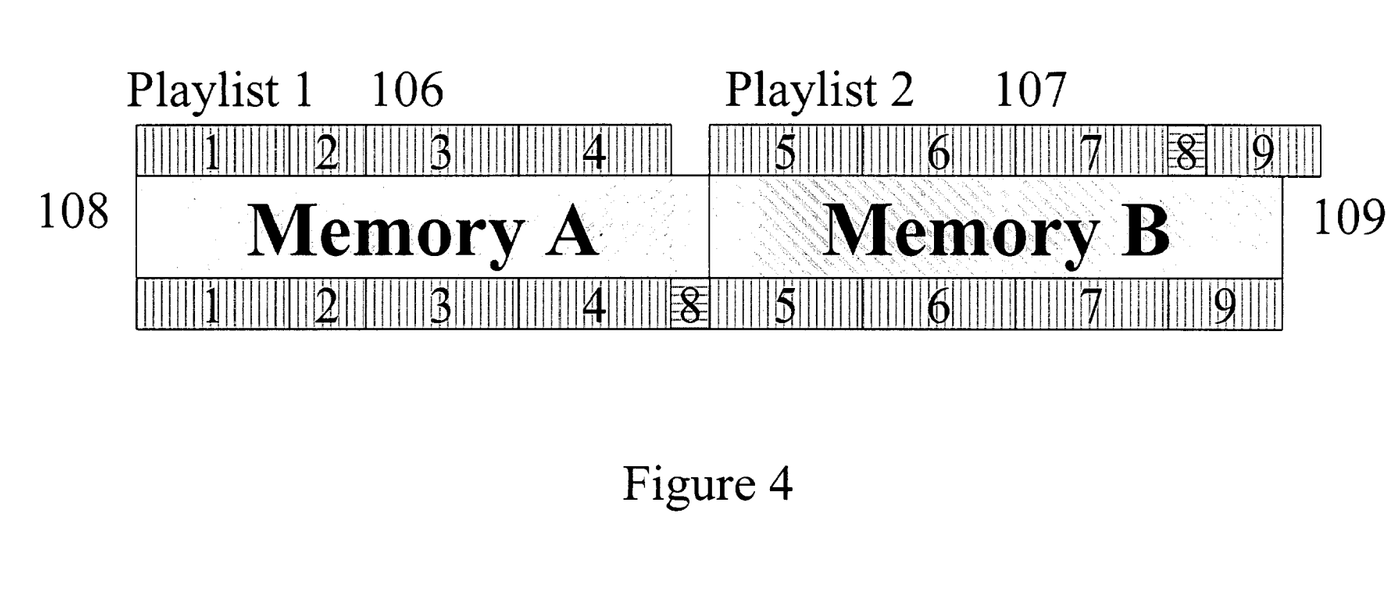
FIG. 4 is a diagram that shows that two consumer/user playlists are re-arranged in their storage order (which does not necessarily represent their playback order) in order to optimize the utilization of memory in a digital media playback device.
Figure 5:
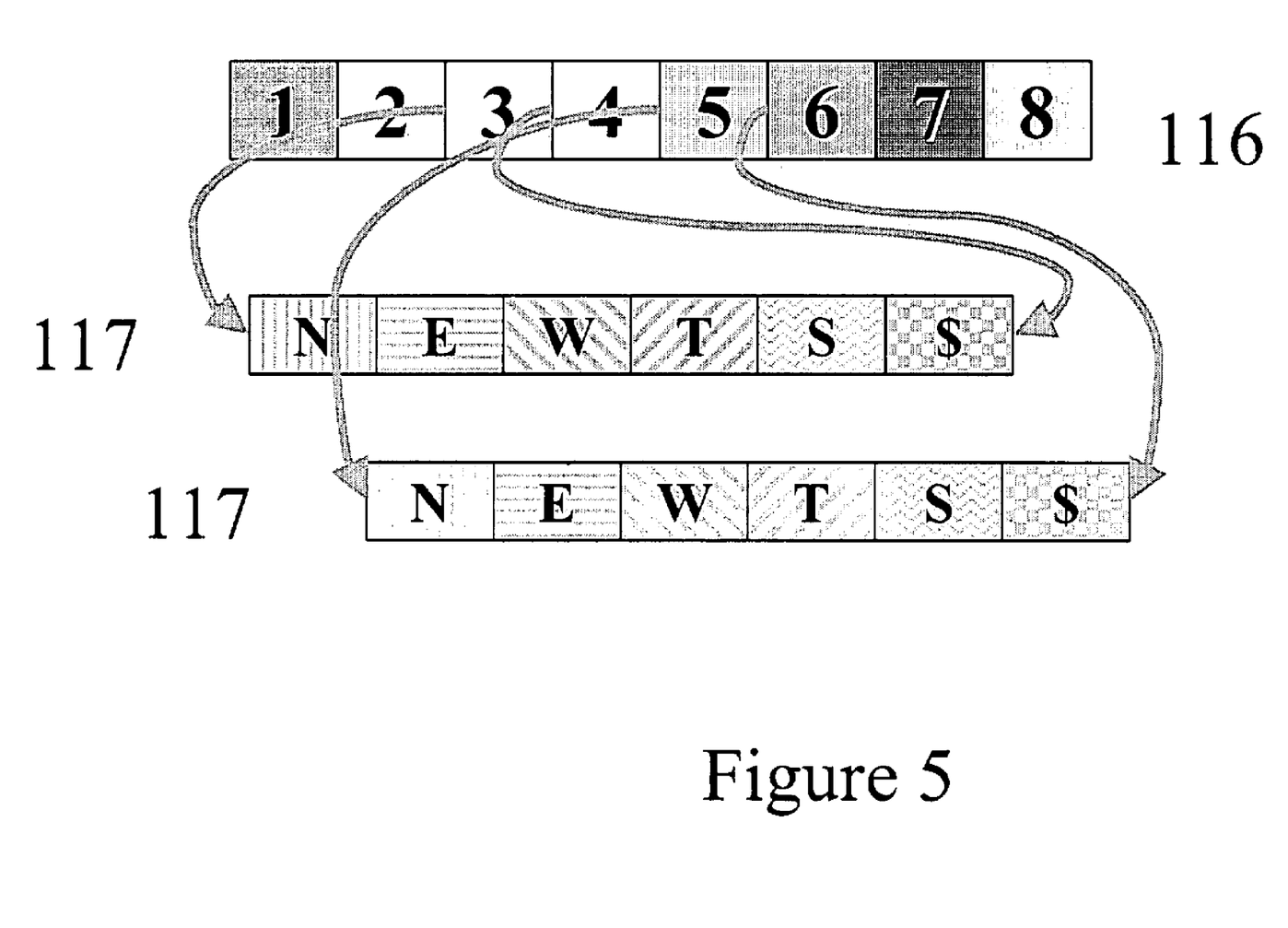
FIG. 5 is a diagram that illustrates how categories (News, Entertainment, Weather, Traffic, Sports and Finances) are accessed from the memory group table.
Figure 6:
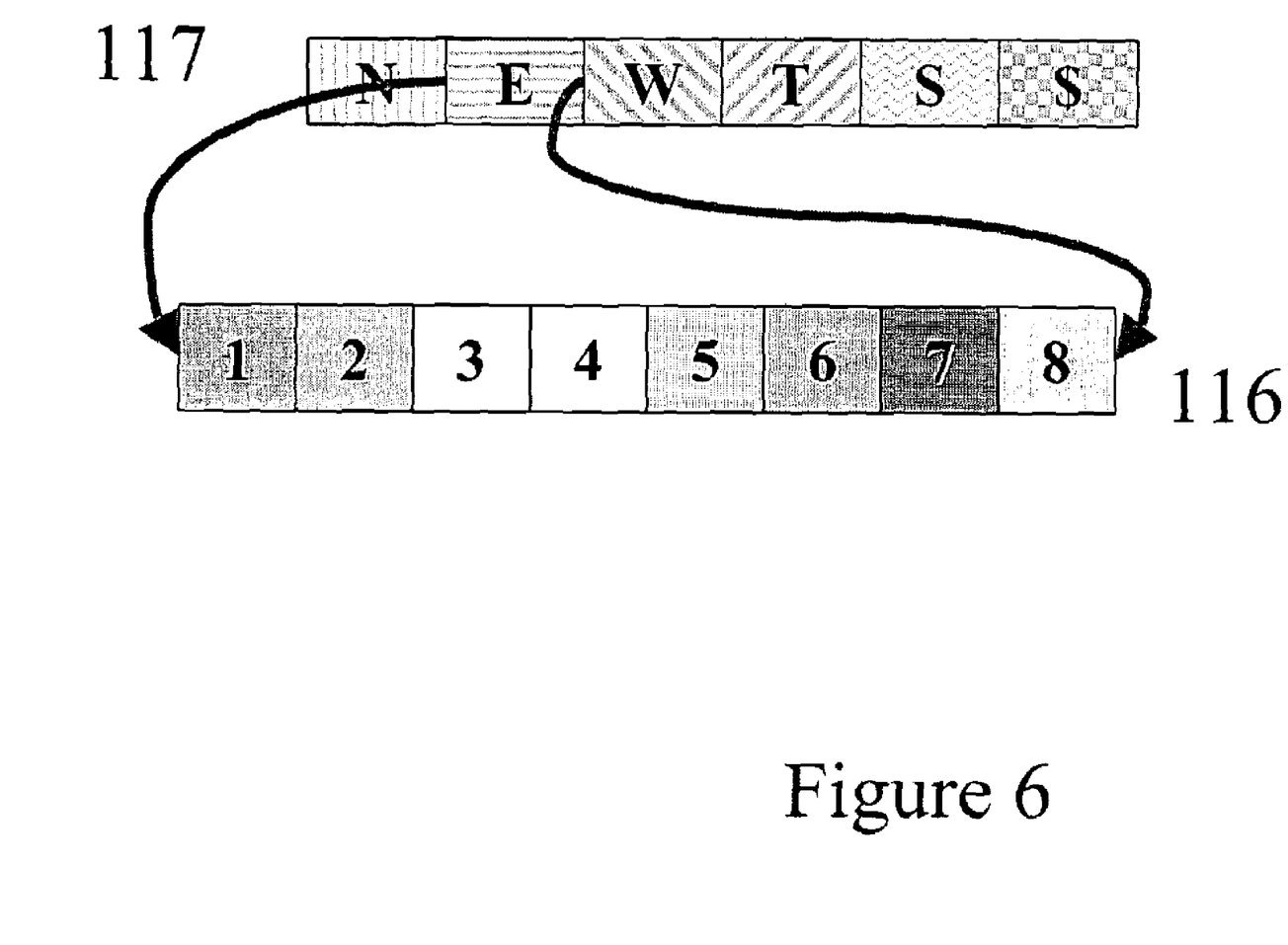
FIG. 6 is a diagram that illustrates how the memory groups are accessed from the category tables.
Figure 7:
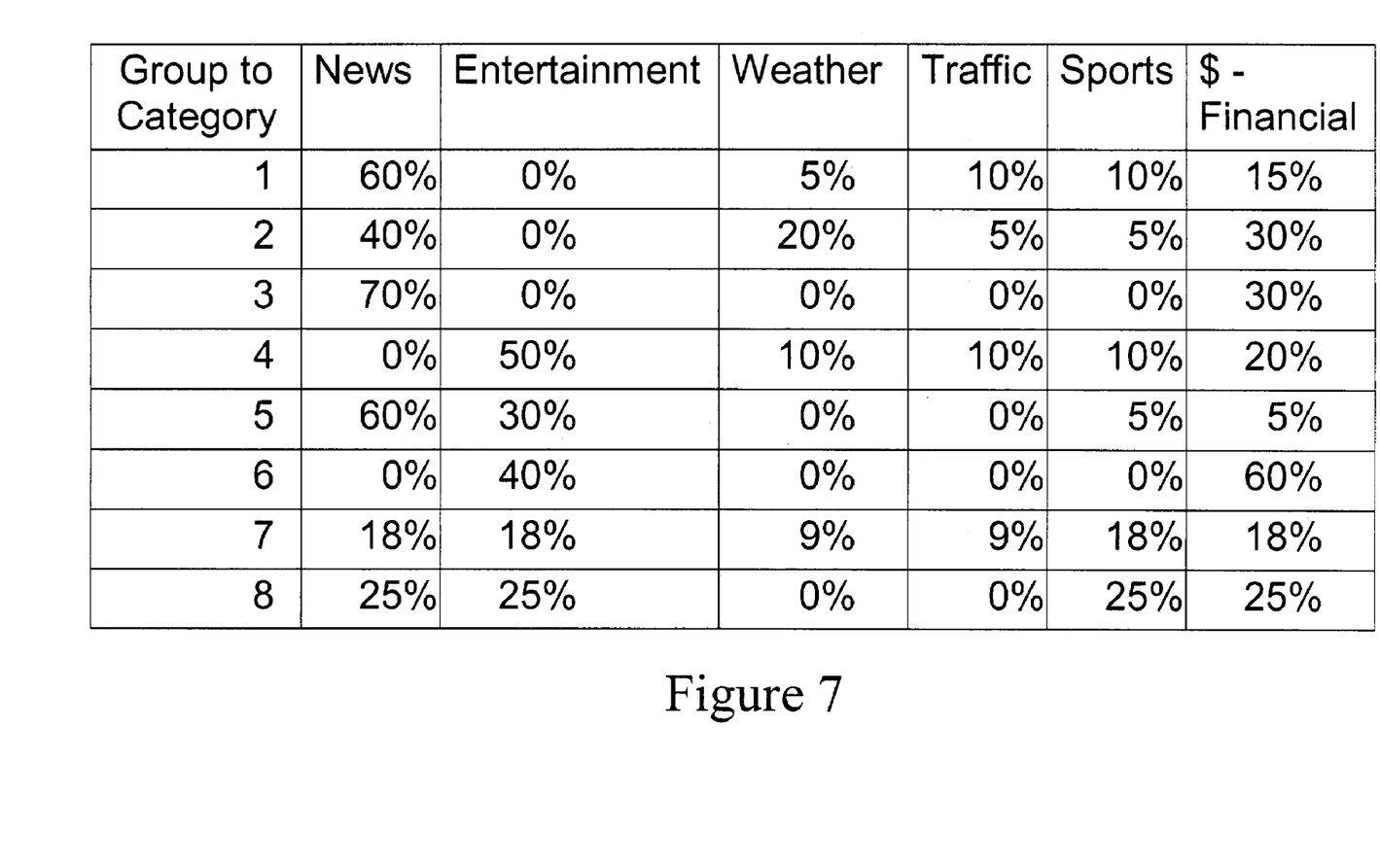
FIG. 7 is a table that illustrates how the space in physical memory groups can have their memory partitioned among the logical memory devices.
Figure 8:
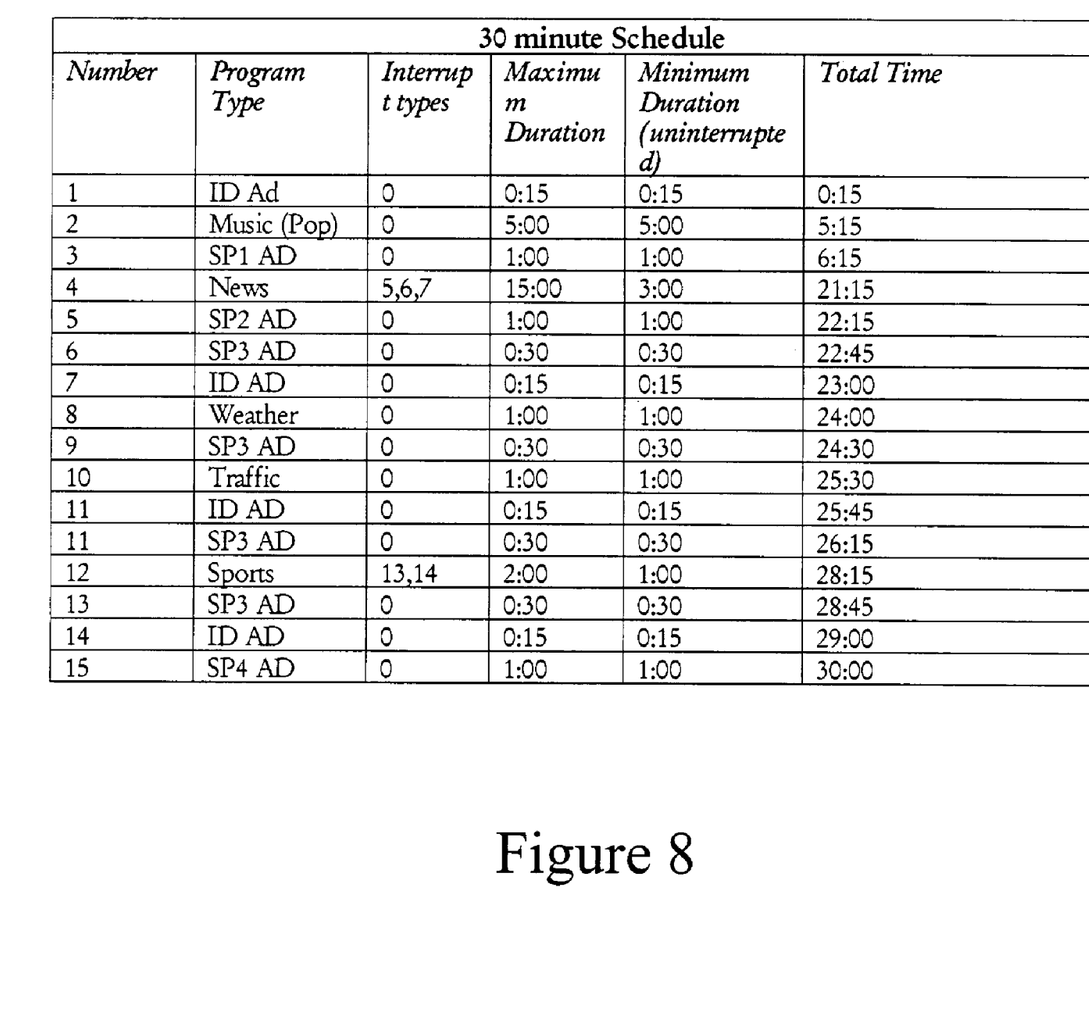
FIG. 8 is a table that illustrates a heuristic rule for the 'programming' of the playback of digital media in a digital media playback device. This set of rules allow for the dynamic substitution of any eligible content from a logical device as described in Chronadio #0002
Figure 9:
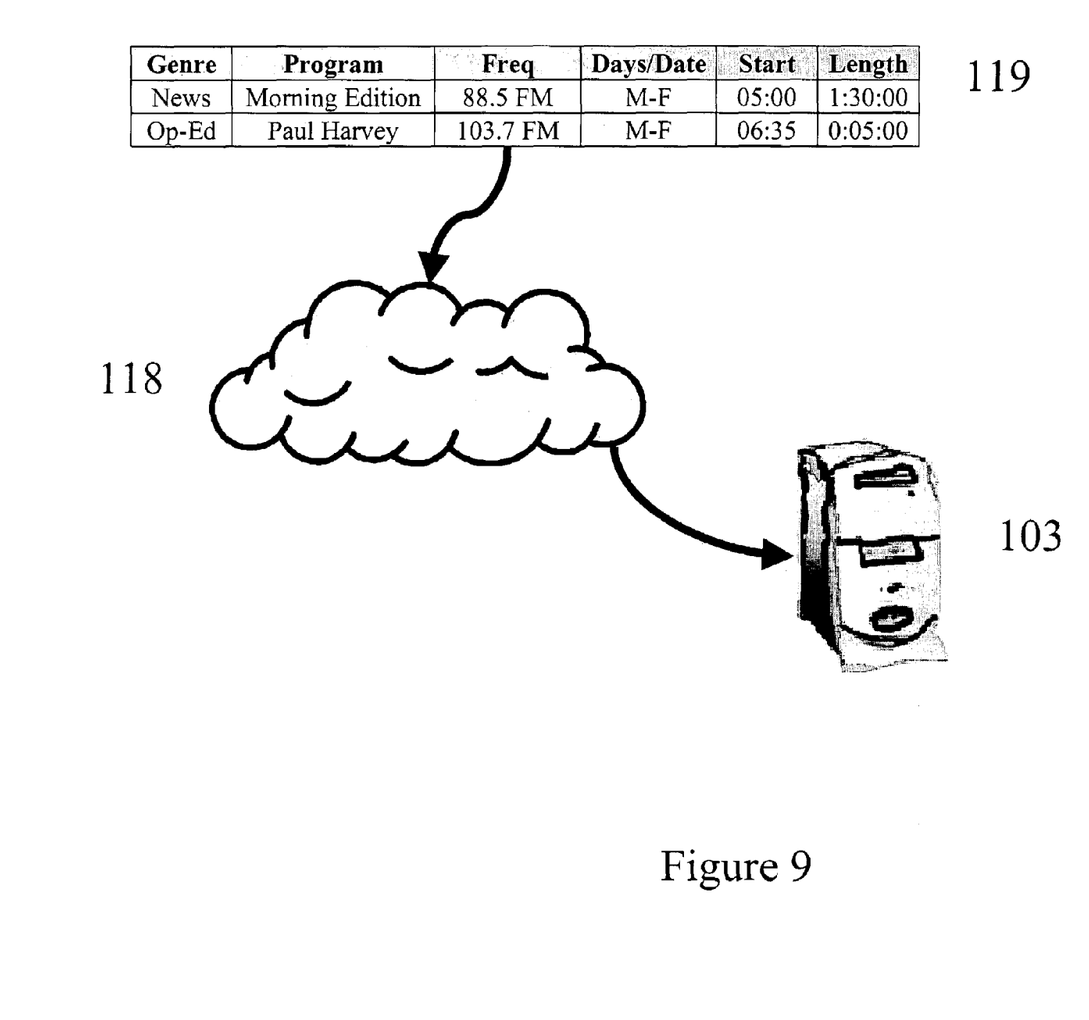
FIG. 9 is a diagram that illustrates the downloading of a program schedule from the Internet to a computer.
Figure 10:
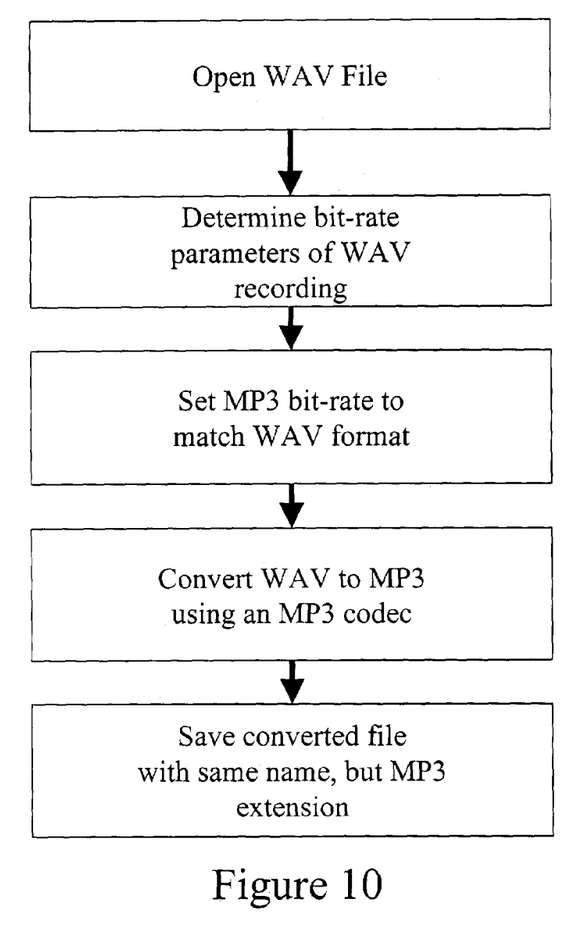
FIG. 10 is a flow diagram that illustrates the process of converting a WAV file to an MP3 file.

The various storage groups (as illustrated in FIG. 3) can each have a half-life threshold. Let's take the example of the traffic report. If the traffic report has been loaded into the digital media player's FLASH memory, we have classified that storage as 'Ephemeral' storage. That is, there is no long-term harm to the consumer if something is deleted from that storage. We treat the disk drive on the consumer's computer as a 'volatile' storage. That is that the media stored there has a longer shelf life, but that the media stored on this media is likely to evaporate over time due to the volatile nature of the storage media.

The implication of this is that we assign different 'threshold' values to each of the media types. In the example of a traffic report that has a half-life of 10 minutes, the threshold for the Ephemeral storage might be 51%. That is, if the age of the media in the storage is less than 51% of the total life of the media, then that piece of media can be flushed from the storage memory to make room for other pieces of media.

In this example, if the traffic report has a 'half-life' of 10 minutes, then the whole life of the media piece is 20 minutes. If the piece of media is more than 10 minutes old, then 50% of the media's life has expired. Since the piece has dropped below the 51% threshold, then the piece can be flushed from the ephemeral storage.

Assuming that the threshold for the 'volatile' disk storage is 1%, then it the media piece with the traffic report will be preserved until nearly the full 20 minutes of its lifetime as a media piece.

What is claimed is:

1. A method of downloading schedules of broadcast programs into a computer, the method comprising:
   recording the programs;
   converting the recorded programs into a format compatible with a digital media playback device;
   managing separate storage regions in a digital media playback device, the method comprising:
   providing a prioritization of media selections based on user criteria;
   providing an organization of media selections to optimize memory usage in separate storage regions;
   providing an index to media selections that are available via a host computer communicatively coupled to the digital media playback device;
   providing a timestamp, half-life value, and a storage threshold value that manage the First-In, First-Out, Least Recently Used or Freshness Aging Algorithm for Digital Media Pieces;
   providing the User/Consumer with the ability to modify the half-life values and/or storage threshold values for any digital media piece;
   providing an index to media selections which are available via network attachments to the host computer which is communicatively coupled to the digital media playback device;
   providing a mechanism to automatically index portable rotating media selected from one of music CD, CD-ROM, CD-R, CD-RW, VCD, DVD-R and DVD-RW; and
   providing a mechanism to automatically create portable rotating media selected from one of CD-R, CD-RW, VCD, DVD-R and DVD-RW.

2. A system of downloading schedules of broadcast programs into a computer, the system comprising:
   means for providing a prioritization of media selections based on user criteria;
   means for providing an organization of media selections to optimize memory usage in separate storage regions;
   means for providing an index to media selections that are available via a host computer communicatively coupled to the digital media playback device;
   means for providing a timestamp, half-life value, and a storage threshold value that manage the First-In, First-Out, Least Recently Used or Freshness Aging Algorithm for Digital Media Pieces;
   means for providing the User/Consumer with the ability to modify the half-life values and/or storage threshold values for any digital media piece;
   means for providing an index to media selections which are available via network attachments to the host computer which is communicatively coupled to the digital media playback device;
   means for providing a mechanism to automatically index portable rotating media selected from one of music CD, CD-ROM, CD-R, CD-RW, VCD, DVD-R and DVD-RW; and
   means for providing a mechanism to automatically create portable rotating media selected from one of CD-R, CD-RW, VCD, DVD-R and DVD-RW.

* * * * *